US007192306B2

(12) United States Patent
Morrison et al.

(10) Patent No.: US 7,192,306 B2
(45) Date of Patent: Mar. 20, 2007

(54) HIGH VOLTAGE CONNECTOR

(75) Inventors: James Morrison, Bayshore, NY (US); Peter Match, South Setauket, NY (US); John D Tanner, Rocky Point, NY (US); Scott Orban, Bayport, NY (US); Michael P Falco, Shirley, NY (US); Scott R Wilson, Shirley, NY (US)

(73) Assignee: Ultra Volt, Inc., Ronkonkoma, NY (US)

( * ) Notice: Subject to any disclaimer, the term of this patent is extended or adjusted under 35 U.S.C. 154(b) by 0 days.

(21) Appl. No.: 11/175,615

(22) Filed: Jul. 6, 2005

(65) Prior Publication Data

US 2007/0010142 A1 Jan. 11, 2007

(51) Int. Cl.
*H01R 13/73* (2006.01)
*H02B 1/01* (2006.01)

(52) U.S. Cl. ...................................... 439/551; 439/736

(58) Field of Classification Search ................ 439/544, 439/546, 551, 579, 320, 322, 736
See application file for complete search history.

(56) References Cited

U.S. PATENT DOCUMENTS 2,385,191 A * 9/1945 Brunelle, Jr. .......... 174/35 SM
2,981,920 A * 4/1961 Jackson ...................... 439/322
3,530,423 A * 9/1970 Davis .......................... 29/857

* cited by examiner

*Primary Examiner*—Javaid H. Nasri
(74) *Attorney, Agent, or Firm*—Ostrolenk, Faber, Gerb & Soffen, LLP

(57) ABSTRACT

A connector having a cylindrical hollow body having a first, closed end and a second, open end. A first external thread extends from the first end toward the second end and a second external thread extends from the second end toward the first end. Additionally, a contact element extends concentrically from the closed first end of the hollow body.

8 Claims, 2 Drawing Sheets

HIGH VOLTAGE CONNECTOR

BACKGROUND OF THE INVENTION

The present invention relates to high voltage connectors used for connecting high voltage leads to equipment. Conventional connectors are made of a synthetic material and are available from companies such as Jettron Products, Inc. and Caton Connector Corp. Such conventional connectors or receptacles are generally, as shown in FIGS. 1 and 2, attached to equipment by being embedded in a potting compound as shown in FIG. 1, or mounted by a flange as shown in FIG. 2. The main purpose of these connectors is to provide a stable connection which prevents arcing.

SUMMARY OF THE INVENTION

Although the prior art high voltage connectors have given acceptable results, it is an object of the present invention to provide improved high voltage connectors which give a more secure connection of leads and further insurance against arcing.

Pursuant to this object, and others which will become apparent hereafter, one aspect of the present invention resides in a high voltage connector having a cylindrical hollow body with a first, closed end and a second, open end. A first external thread extends from the first end towards the second end along a portion of the length of the body. A second external thread extends from the second, open end toward the first end over a portion of the length of the hollow body. A metal element is mounted to the closed end of the hollow body so as to be concentric with the hollow body. The metal element has an eyelet that projects axially from the closed end. The metal element also has a pin that projects concentrically into the hollow body.

In another embodiment of the invention, the first thread and the second thread are different. For example, the first thread can be coarser than the second thread, or vice versa.

In still another embodiment of the invention, the first thread and the second thread extend along the hollow body for substantially equal lengths. Alternatively, the first thread can, as needed, extend over a greater or lesser length of the hollow body than the second thread.

In a further embodiment of the invention, the first end of the hollow body has a different diameter than the second end of the hollow body. In still another embodiment of the invention, the first end of the hollow body has a larger diameter than the second end. In yet another embodiment, the larger diameter extends for more than half the length of the hollow body.

Still another object of the present invention is to provide an improved sleeve for mounting the connectors. Sleeves are known in the prior art which are substantially cylindrical in shape and have a smooth internal bore. According to the present invention, the internal bore is provided with a thread that mates with the first external thread of the hollow body of the connector whereby the connector can be threaded into the sleeve.

Other features and advantages of the present invention will become apparent from the following description of the invention that refers to the accompanying drawings.

DETAILED DESCRIPTION OF THE INVENTION

Figure 3:
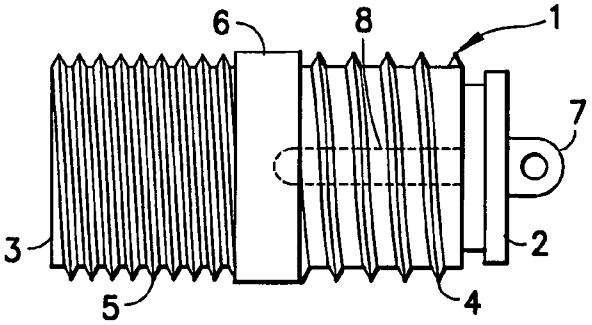
FIG. 3 is side view of a connector pursuant to the present invention.
Figure 4:
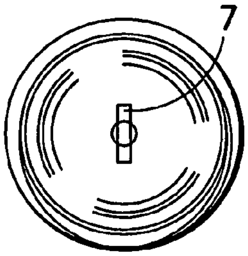
FIG. 4 is an end view of FIG. 3.
Figure 5:
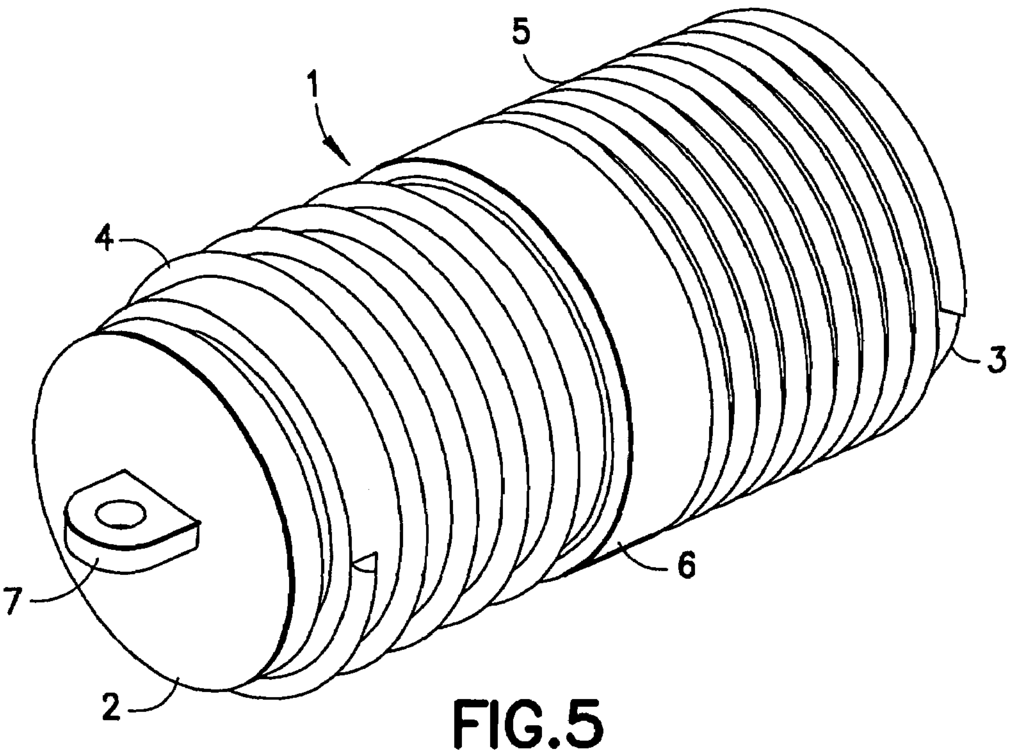
FIG. 5 is a perspective view of the connector of FIG. 3.

The inventive high voltage connector, as shown in FIG. 3, has a cylindrical hollow body 1 with a first closed end 2. A second end 3 is open. A first external thread 4 extends from the first end 2 toward the second end 3 over a portion of the length of the body 1. A second external thread 5 extends from the second end 3 toward the first end 2 over a portion of the length of the hollow body 1.

FIG. 3 shows a central region 6 that has no threading. This unthreaded region can be of any desired length, depending upon the application in question. The same is true for the lengths of the first and second threads. The extent to which either of the threads extends over the length of the hollow body can be determined by those skilled in the art depending upon the specific application. The same holds true for the actual thread size.

As shown in FIG. 3, the closed end 2 is provided with a metal eyelet 7 and a pin 8 that extends coaxially in the interior of the hollow body 1.

Figure 1:
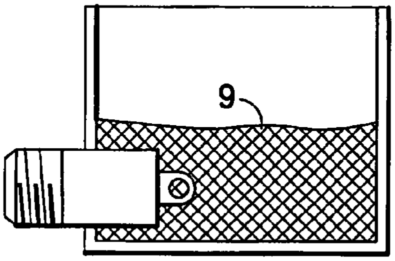
FIG. 1 PRIOR ART
FIG. 1 shows a prior art connector.
Figure 2:
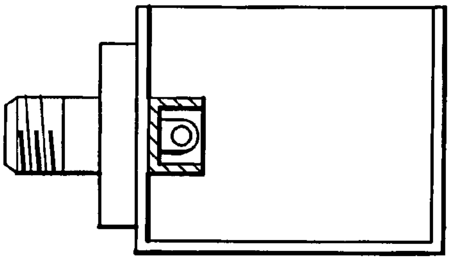
FIG. 2 PRIOR ART
FIG. 2 shows another type of prior art connector.

The inventive connector of FIG. 3 provides that the first thread 4 allows the connector to be screwed into the component and then a potting compound 9 can additionally be added to encapsulate the first end of the connector, as shown in FIG. 1. In this way, both a form locking and an adhesive connection are provided.

Figure 6:
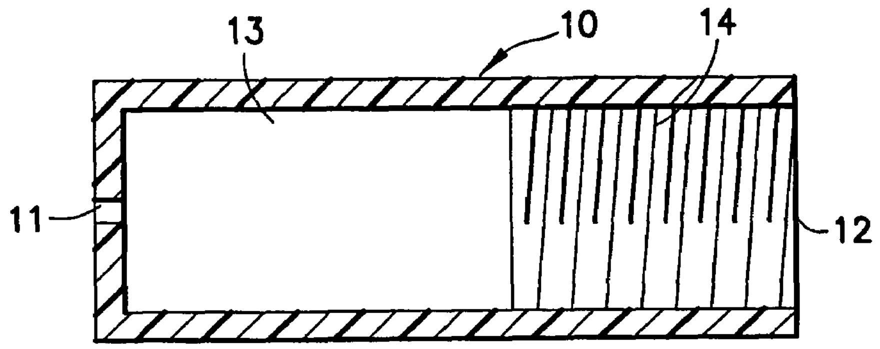
FIG. 6 is a cross-section through a sleeve of the present invention.

FIG. 6 shows a cross-section through the inventive sleeve 10. As can be seen, the sleeve is essentially a hollow cylindrical member having openings 11, 12 at each end. The size of the openings 11, 12 are determined by the specific application. The sleeve 10 also has a first unthreaded portion 13 and a threaded portion 14. The threaded portion 14 is an internal thread that matches the external thread 4 on the first end 2 of the hollow body 1. The diameters of the first and second portions 13, 14 can be the same or different, depending upon the specific application.

Specific advantages of the presently claimed invention over the prior art include that the first threads 4 break up and add length to the path for potential arcs originating from the eyelet 7. Furthermore, the partition region 6 provides a hard stop making it easier to mount the connector to a component.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A connector, comprising: a cylindrical hollow body having a first, closed end and a second, open end; a first external thread formed on the cylindrical hollow body extending from the first end toward the second end; a second external thread formed on the cylindrical hollow body and extending from the second end toward the first end; and a contact element extending concentrically from the closed first end of the hollow body, wherein the contact element further comprises an eyelet extending outward from the closed first end of the hollow body and a pin extending inward from the closed first end.

2. The connector according to claim 1, wherein the first thread and the second thread are different from one another.

3. The connector according to claim 2, wherein the first thread is coarser than the second thread.

4. The connector according to claim 1, wherein the cylindrical hollow body has an external partition that separates the first thread from the second thread.

5. The connector according to claim 1, wherein the first thread extends over a length of the body that is greater than the length of the body over which the second thread extends.

6. The connector according to claim 1, wherein the second end of the hollow body has a different diameter than the first end of the hollow body.

7. The connector according to claim 6, wherein the second end of the hollow body has a smaller diameter than the first end.

8. A combination comprising: a connector having a cylindrical hollow body having a first, closed end and a second, open end, a first external thread formed on the cylindrical hollow body and extending from the first end toward the second end, a second external thread formed on the cylindrical hollow body and extending from the second end toward the first end, and a contact element extending concentrically from the closed first end of the hollow body, wherein the contact element further comprises an eyelet extending outward from the closed first end of the hollow body and a pin extending inward from the closed first end; and a sleeve having a hollow cylindrical body having a first opening at one end and a second opening at another end, and an internal thread extending from the second end over a portion of the length of the hollow body, the first external thread of the connector matching the internal thread of the sleeve so that the connector can be threaded into the sleeve.

* * * * *